Oct. 14, 1930.   H. F. PATTON   1,778,371
WELL STRAINER
Filed June 11, 1928   3 Sheets-Sheet 2
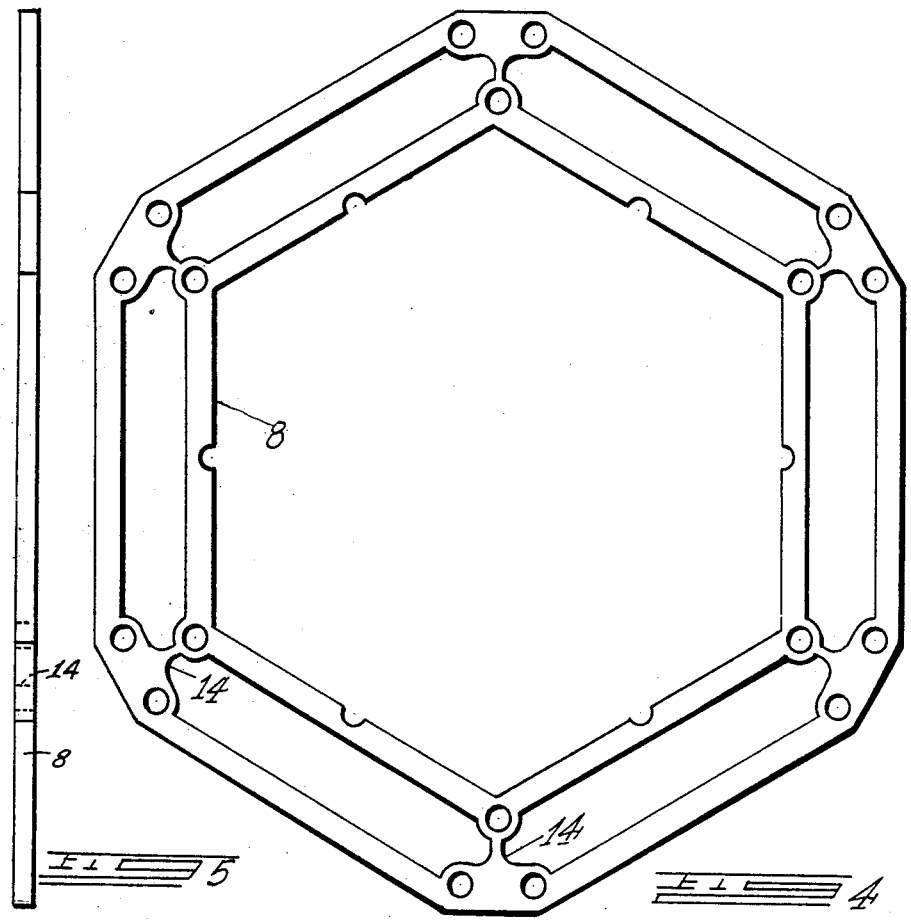
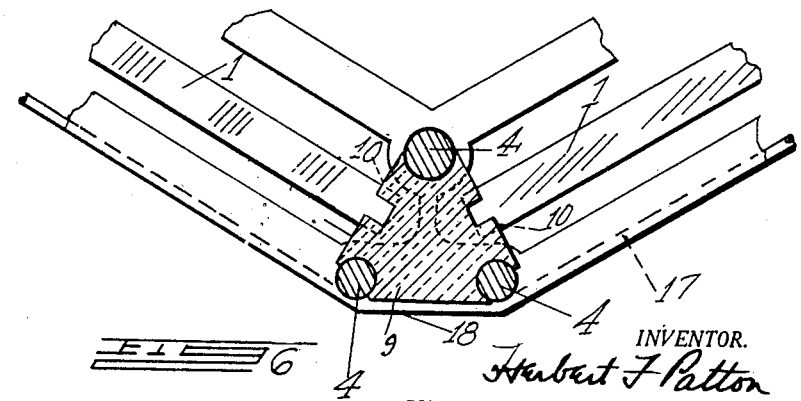
INVENTOR.
Herbert F Patton
BY
Allen & Allen
ATTORNEY.

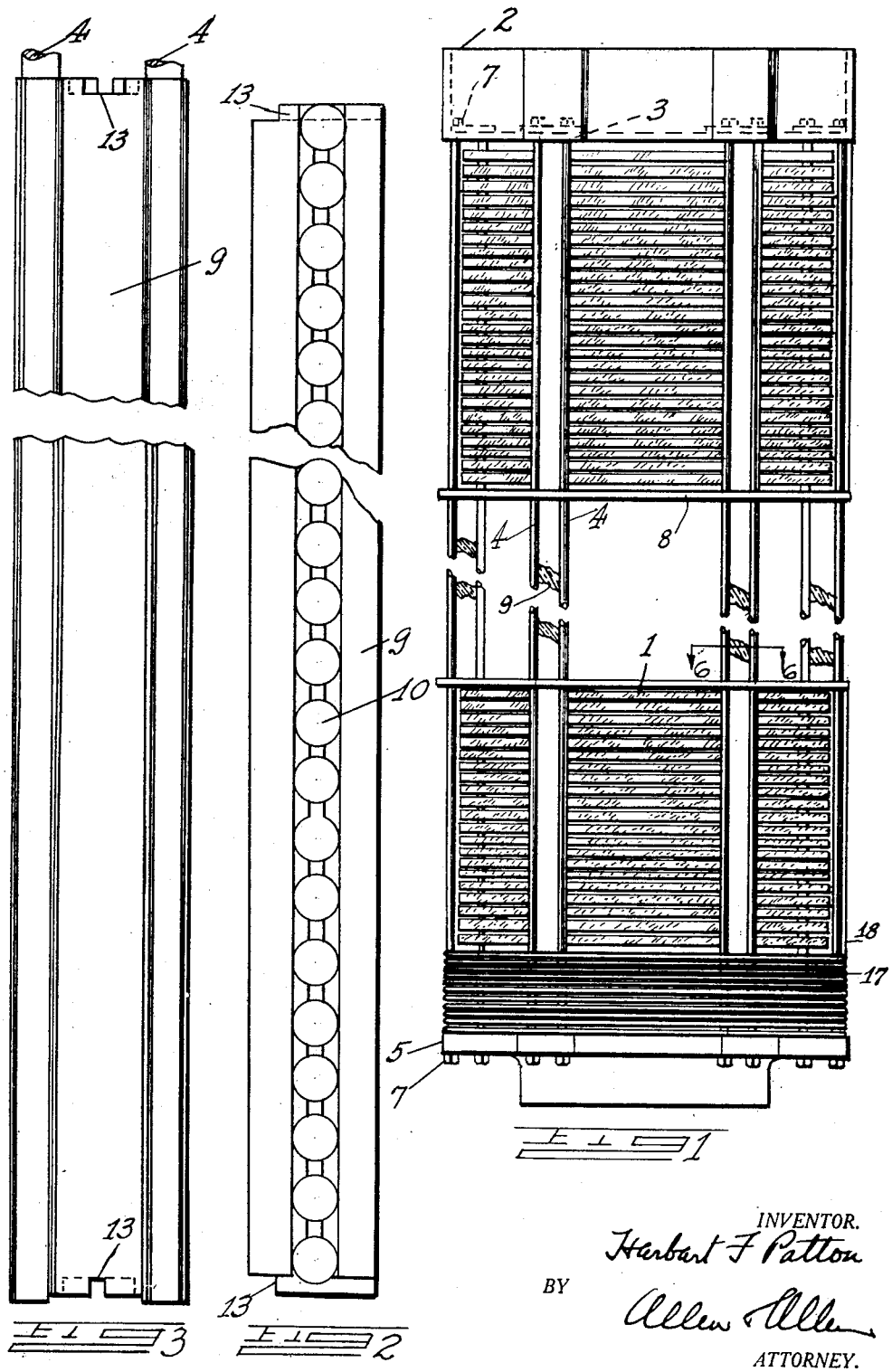

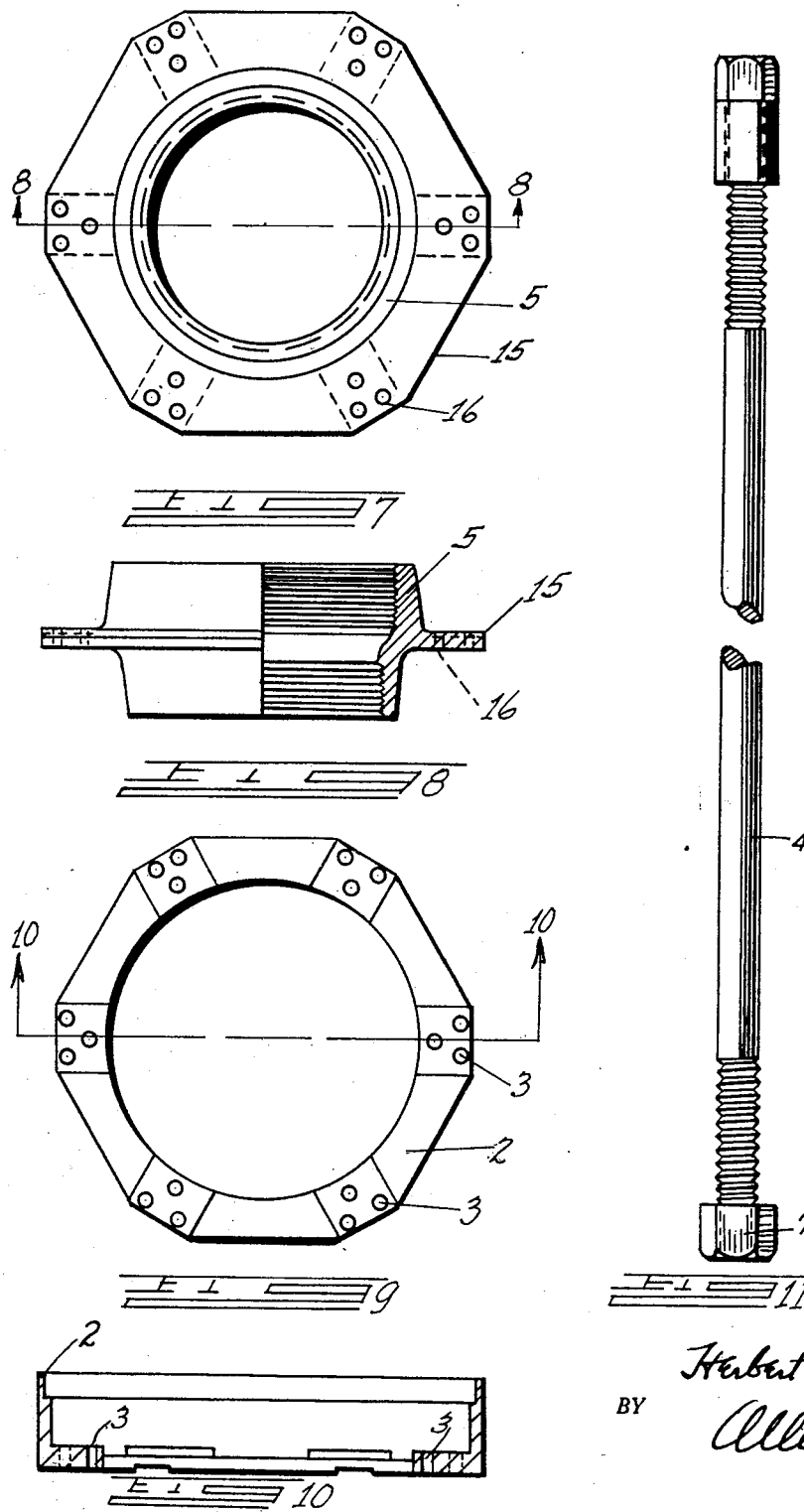

Patented Oct. 14, 1930

1,778,371

UNITED STATES PATENT OFFICE

HERBERT F. PATTON, OF LAWRENCEBURG, INDIANA, ASSIGNOR TO A. D. COOK, INC., OF LAWRENCEBURG, INDIANA, A CORPORATION OF INDIANA

WELL STRAINER

Application filed June 11, 1928. Serial No. 284,399.

My invention relates to well strainers and particularly to deep well strainers which are used for making sand tight joints with well casings by being flanged or welded to well casings or by being attached with lead rings or specially threaded collars.

In my co-pending application Serial No. 197,456, filed June 8, 1927, I have disclosed a well strainer made from a series of spaced glass straining units which are united in a composite assembly in which the fluid to be strained passes through openings between the spaced glass pieces. I have found that although in principle the several modifications disclosed in this application are entirely practical, from a manufacturing standpoint they are quite expensive. It is the object of my invention as disclosed herein to provide a strainer which can be made entirely practically in factory scale production.

It is my object to utilize tubular glass pieces and to so mount them in an assembly that filtering orifices will be provided between the tubes. It is further my object to so support the tubes in the assembly that they will not be readily susceptible to being fractured by a sudden jar or blow from some unexpected source.

The above and other objects to which reference will be made in the ensuing disclosure I accomplish by that certain combination and arrangement of parts of which I have illustrated a preferred embodiment.

Referring to the drawings:—

Figure 1 is a side elevation of the strainer assembly with the glass tubes forming the straining orifices only shown at the top and bottom of the assembly.

Figure 2 is a side elevation of the rubber support for the tubes.

Figure 3 is a rear elevation of the rubber support shown in Figure 2 with the position which two of the tie rods assume with relation to the support also indicated.

Figure 4 is a plan view of one of the castings which maintain the tie rods in position.

Figure 5 is a side elevation of the casting shown in Figure 4.

Figure 6 is a detail sectional view taken along the lines 6—6 in Figure 1.

Figure 7 is a plan view of the member which forms the bottom of the assembly.

Figure 8 is a sectional view taken along the lines 8—8 in Figure 7.

Figure 9 is a plan view of the member which forms the top of the assembly.

Figure 10 is a sectional view of the top casting taken along the lines 10—10 in Figure 9.

Figure 11 is a detail view showing one of the tie rods.

As has been noted, the strainer is formed of a series of short pieces 1 of glass tubing held in place in a composite assembly. The head for the strainer is indicated at 2 having a series of spaced apertures 3 through which the tie rods 4 extend. The base 5 of the assembly also has spaced apertures 6 through which the lower ends of the tie rods extend. The tie rods are secured in position by nuts 7 which are secured in threads at the ends of the rods.

For securing the tie rods in a rigid assembly, spacing castings 8 are mounted on the rods at desirable intervals. Rubber supporting members 9, having on two of the opposite faces a series of spaced recesses 10, retain the glass tubes 1 in position so that the liquid to be strained passes through the orifices 12 between the tubes. The tie rods 4 may be of desired number. I have shown groups of three which, as indicated in Figure 6, retain the rubber supports in position.

The rubber supports will be as many in number as there are corners to the strainer assembly. I prefer to make the strainer sections of about one foot in length and as many sections may be combined as will be required for the well. The tie rods will preferably be of suitable length to extend from the top to the bottom of the strainer assembly. The rubber supports have recesses 13 which engage the radial braces 14 of the spacing castings.

At the bottom of the strainer, I have shown a coupling member 5 having a flange 15. Apertures 16 for seating the lower ends of the tie rods are extended through the flange 15. If the strainer is to be used at the bottom of a well pipe a plug may be secured within the threaded reduced portion of the bottom coupling.

In the use of glass tubing I believe that I have selected the lightest and strongest type of glass straining unit which may be made. Glass tubing has much greater strength than glass rods would have and the liability to fracture from sudden changes of temperature is less. Molded glass bars might also be used instead of the tubes, but the tensile strength of the blown glass tubes is so much greater that I find them preferable.

While this has been my experience, special care in tempering might not make such a difference between glass tubes and glass rods.

Modifications in the particular arrangement shown in which the glass tubes are supported in other than horizontal position will readily occur to those skilled in the art. While I have shown a six sided assembly, if the size of the strainer is to be enlarged a figure having any desired number of faces may be made.

In order to protect the tubing from accidental blows during shipment or use I prefer to wrap the assembly with wire such as is indicated in Figure 1 at 17. The wire will bear against the outer of the tie rods 4 and also countersink within an extended portion 18 of the rubber support 9. While the particular support for the tubes which I have described is made of rubber other resilient materials having similar properties may also be used.

Having thus described my invention, what I claim as new and desire to secure by Letters Patent, is:—

1. A well strainer composed of a series of spaced glass tubes having filtering orifices between the tubes, said tubes being held together in a composite assembly, with resilient supports for the tubes to prevent fracture thereof.

2. A well strainer composed of a series of spaced glass tubes having filtering orifices between the tubes, said tubes being arranged horizontally and being held together in a composite assembly, with resilient supports for the tubes to prevent fracture thereof.

3. A well strainer having a top and bottom head with tie rods passing between the heads, and resilient supports extending between the tie rods being retained thereby, and a series of glass tubes extending laterally between the resilient supports with filtering orifices between the tubes.

4. A well strainer having a top and bottom head with tie rods passing between the heads, and resilient supports extending between the tie rods being retained thereby, and a series of glass tubes extending laterally between the resilient supports with filtering orifices between the tubes, said tubes forming faces of a tubular body having equilateral faces.

5. A well strainer having a top and bottom head with tie rods passing between the heads, and resilient supports extending between the tie rods being retained thereby, and a series of glass tubes extending laterally between the resilient supports with filtering orifices between the tubes, with spacing castings arranged at spaced intervals in the strainer for reinforcing the tie rods.

6. A well strainer composed of a series of straining units comprising tie rods extending longitudinally of the units, spacing plates reinforcing the tie rods forming the top and bottom of the units, and resilient supports extending longitudinally of the units, with glass tubes retained in spaced position between the supports.

7. A well strainer composed of a series of straining units comprising tie rods extending longitudinally of the units, spacing plates reinforcing the tie rods forming the top and bottom of the units, and resilient supports extending longitudinally of the units, with glass tubes retained in spaced position between the supports, with wire wrapped around the outer periphery of the units.

8. A well strainer having a top and bottom head with tie rods passing between the heads, and resilient supports extending between the tie rods being retained thereby, and a series of glass tubes extending laterally between the resilient supports with filtering orifices between the tubes, and wire wrapped around the outer periphery of the strainer for protecting the glass tubes.

9. A well strainer having a top and bottom head with tie rods extending between the heads, resilient supports held in position by said tie rods, and spaced glass members extending laterally around the periphery of the strainer between the supports, said members being spaced both longitudinally and laterally.

10. A well strainer composed of short pieces of glass arranged in a series of angular units, said units having filtering orifices therebetween and being resiliently supported in rigid framework members.

HERBERT F. PATTON.